United States Patent [19]

Terneu et al.

[11] Patent Number: 5,089,039
[45] Date of Patent: Feb. 18, 1992

[54] METHOD FOR PYROLXTICALLY FORMING A SILICON OXIDE COATING ON A HOT GLASS SUBSTRATE

[75] Inventors: Robert Terneu, Thiméon; Jean-François Thomas, Ottignies, both of Belgium

[73] Assignee: Glaverbel, Brussels, Belgium

[21] Appl. No.: 537,814

[22] Filed: Jun. 14, 1990

[30] Foreign Application Priority Data

Jun. 19, 1989 [GB] United Kingdom ............... 8914047

[51] Int. Cl.⁵ ............................................. C03C 25/02
[52] U.S. Cl. ................................. 65/60.5; 65/60.51; 65/60.52; 65/60.80
[58] Field of Search ............... 65/60.2, 60.5, 60.51, 65/60.52, 60.8

[56] References Cited

U.S. PATENT DOCUMENTS

| | | | |
|---|---|---|---|
| 3,923,484 | 12/1975 | Randall | 65/60.5 X |
| 4,411,678 | 10/1983 | Arai | 65/3.12 |
| 4,469,045 | 9/1984 | Chesworth | 65/60.5 X |
| 4,828,880 | 5/1989 | Jenkins et al. | 65/60.8 X |
| 4,910,088 | 3/1990 | Baudin et al. | 428/432 |

FOREIGN PATENT DOCUMENTS

| | | |
|---|---|---|
| 1202631 | 8/1970 | United Kingdom . |
| 1462253 | 1/1977 | United Kingdom . |
| 1507465 | 4/1978 | United Kingdom . |
| 1507996 | 4/1978 | United Kingdom . |
| 2066805A | 7/1981 | United Kingdom . |
| 2124924A | 2/1984 | United Kingdom . |
| 2163146A | 2/1986 | United Kingdom . |
| 2196349A | 4/1988 | United Kingdom . |
| 2209176A | 5/1989 | United Kingdom . |

OTHER PUBLICATIONS

Refractories, Ceramics, "Thermal Radiation Reflection in Glass Improved by Coating Glass with Thermally-Decomposable Cpd. During Float-Extrusion"; Asahi Glass KK.; Dec. 7, 1972; p. 1 (36455W/22*J4 9080-120).

Primary Examiner—Robert L. Lindsay
Attorney, Agent, or Firm—Spencer & Frank

[57] ABSTRACT

A method of pyrolytically forming a silicon oxide coating on a hot glass substrate as it travels past a coating chamber includes contacting the substrate with silane-containing coating precursor material in the presence of oxygen. The silane-containing coating precursor material is in the vapor phase and it and gaseous oxygen are intimately mixed before they enter the coating chamber to contact the substrate. Silane as coating precursor material may be conveyed towards the coating chamber in vapor phase in a substantially inert carrier gas stream and oxygen introduced into the silane-containing carrier gas stream before it enters the coating chamber. The coating operation may take place within a coating chamber within a float chamber in which the glass is formed into ribbon.

19 Claims, 2 Drawing Sheets

METHOD FOR PYROLXTICALLY FORMING A SILICON OXIDE COATING ON A HOT GLASS SUBSTRATE

BACKGROUND OF THE INVENTION

1. Field of the invention

This invention relates to a method of and apparatus for pyrolytically forming a silicon oxide coating on an upper face of a hot glass substrate.

2. Description of the Related Art

This invention was made as a result of research into various problems connected with the pyrolytic formation of silicon oxide coatings on glass. Silicon oxide coatings can be used either as sole coatings on glass for various purposes, or as one stratum of a multi-layer coating. For example, silicon oxide coatings may be used as subbing layers to be overcoated with other coating layers which may be of one or more different oxides or other materials such as metals, or as overcoating layers deposited on top of one or more such underlayers. The presence of a silicon oxide coating on soda-lime glass has the particular benefit of inhibiting the migration of sodium ions from the glass whether by leaching in the case of a sheet having no further coating, or by diffusion or otherwise into an upper coating layer either during formation of that upper layer or over the course of time. As an example, it has been found that in the pyrolytic formation of a tin oxide coating from stannic chloride on a soda-lime glass substrate, sodium chloride tends to become incorporated into the coating as a result of reaction of the glass with the coating precursor material or its reaction products, and this leads to haze in the coating. The presence of a silicon oxide undercoating or overcoating can also have a highly beneficial effect in reducing undesired interference effects due to variations in the thickness of the total coating.

The use of a silane, in particular SiH$_4$, as coating precursor material is well known per se for the formation of pyrolytic coatings on glass. Silane decomposes at temperatures above 400° C., and silicon coatings may be formed. It is difficult, however, to oxidise such a silicon coating in situ to form a silicon oxide coating. For this reason, it is preferable to react the silane directly with oxygen. In order that this reaction should take place to deposit silicon oxide on the glass substrate rather than on some part of the coating apparatus, all known proposals for the use of a silane-containing coating precursor material in the formation of a silicon oxide coating have insisted that the coating precursor material should only be allowed to mix with oxygen within a coating chamber which is open to the substrate to be coated, at a location where those materials are free to contact the substrate directly. We, however, have found that this is not favourable for the production of silicon oxide coatings of high and uniform quality, and in particular, there are problems in achieving a coating of uniform thickness across the width of the substrate.

SUMMARY OF THE INVENTION

It is an object of this invention to alleviate these problems.

According to the present invention, there is provided a method of pyrolytically forming a silicon oxide coating on a hot glass substrate as it travels past a coating chamber by contacting the substrate with silane-containing coating precursor material in the presence of oxygen, characterised in that silane-containing coating precursor material in the vapour phase and gaseous oxygen are intimately mixed before they enter the coating chamber to contact the substrate.

A method according to the present invention, due to the early mixing of the coating reagents, affords great benefits in the achievement of a uniform coating across the width of the substrate. Surprisingly, the early mixing does not lead to such premature reaction of the coating precursor material as would be expected from the teaching of the prior art, and it is in fact favourable for the production of high quality silicon oxide coatings.

It is preferred that the substrate reaches the coating chamber with a temperature of at least 400° C. Such temperatures are very suitable for the rapid formation of a silicon oxide coating from a silane-containing coating precursor. It is also to be noted that as a general rule, the higher the temperature of the glass during coating formation, the more rapid is the coating reaction so that the coating yield, that is, the proportion of coating precursor material which is converted into useful coating oxide, is increased, and for a given speed of ribbon advance, it is possible to form a thicker coating if desired. For this reason also, it is preferred that the coating precursor material first contacts the glass when the glass has a temperature of at least 650° C. For many purposes, the glass may have a temperature of between 700° C. and 750° C. when it is first contacted by the coating precursor material.

The invention could be used for the formation of a silicon oxide coating on pre-cut and reheated glass sheets if this was required. However, when it is desired to manufacture pyrolytically coated flat glass, it is best to do so when the glass is newly formed. To do so has economic benefits in that there is no need to reheat the glass for the pyrolytic reactions to take place, and it also has benefits as to the quality of the coating, since it is assured that the surface of the glass is in pristine condition. Preferably, therefore, such pre-mixed oxygen and coating precursor material are brought into contact with an upper face of a hot glass substrate constituted by freshly-formed flat glass.

The coating chamber could for example be located in or near the upstream end of an annealing lehr through which the ribbon advances, and the ribbon could be formed either in a drawing machine or in a float chamber.

However, we have found that certain problems arise in converting a lehr formerly used for annealing uncoated glass to form a lehr and coating station for the production of coated glass. Such problems arise as a result of the possibly different temperature conditions for forming a pyrolytic coating on the one hand and for proper annealing of the glass on the other, and as a result of constratints on the space available for locating a coating station. The problem is compounded if it is desired to form a multi-layer coating, when clearly two or more different coating stations might be required. Furthermore, the coating reactions have a cooling effect on the glass, not only in that the glass is cooled overall, but also, the coated surface tends to be cooled more than the uncoated surface: thus a different temperature regime has often to be established within an annealing lehr equipped with one or more coating stations when changing from the production of coated glass to uncoated glass and back again, and sometimes even when a substantial change is made to the thickness of the coating applied to the glass.

In order to alleviate these problems, it is most preferred that such pre-mixed oxygen and coating precursor material are brought into contact with an upper face of a hot float glass substrate while the glass is within a float chamber in which it is manufactured.

By operating according to this preferred embodiment of the invention and forming the coating within the float chamber, any necessity for finding space for the coating station in or near the upstream end of an annealing lehr is avoided. Furthermore, we have found that it is possible to ensure that the temperature of the glass ribbon leaving the float chamber is substantially unaffected whether the ribbon is coated or not, and accordingly there is no need to modify the temperature regime in an annealing lehr when switching that coating chamber into or out of operation.

It is rather surprising to propose to form an oxide coating within a float chamber. Float chambers contain a bath of molten metal, wholly or mainly tin, which is rather easily oxidisable at the temperatures required for the glass ribbon to spread out and become fire-polished, and accordingly it is universal practice to maintain a reducing atmosphere within the float chamber, because any surface dross picked up by the glass ribbon from the surface of the metal bath would be a source of defects in the glass produced. Typically such atmosphere contains about 95% nitrogen and about 5% hydrogen and it is maintained at a slight overpressure to prevent oxygen from leaking into the float chamber from the ambient atmosphere. Much research has also gone into removing dross which almost always forms on the surface of the metal bath despite all the precautions taken to avoid allowing oxygen into the float chamber. It therefore goes against the tide of the teaching about the production of float glass deliberately to maintain oxidising conditions in the float chamber. We have however found that it is possible to create oxidising conditions within a float chamber without giving rise to the expected problems. We believe that this is at least in part due to the fact that said coating precursor material is brought into contact with said face in a coating chamber. The use of a coating chamber facilitates confinement of the oxidising conditions, of the coating precursor material, and of the coating reaction products so that their effect on the bath of metal in the float chamber can be rendered small or negligible.

The coating may be formed at any position along the float chamber downstream of the position where the ribbon has reached its final width, and the actual position selected will depend on the temperature desired for initiating coating of the glass. The glass is withdrawn from the float chamber for passage to the annealing lehr at a temperature which is usually in the range of 570° C. to 650° C. Ribbon temperatures above 570° C. are inherently suitable for the pyrolytic coating reactions to take place, so the coating station could in fact be located quite close to the exit from the float chamber. Preferably, however, the coating precursor material contacts the glass at a position along the float chamber such that the glass has a temperature which is at least 50° C. and preferably at least 100° C. higher than the temperature at which the glass would exit from the float chamber if no coating were formed therein. The adoption of this preferred feature of the invention affords the advantage that there is ample time for the ribbon to regain heat given up during the coating reactions so that when it does leave the float chamber, its temperature is substantially unaffected by the coating operation.

Advantageously, the coating precursor material contacts the glass within a said coating chamber, which chamber is defined by the substrate path and a downwardly opening hood, and the coating chamber is aspirated around substantially the whole of its periphery. This assists in preventing the escape of unused coating precursor and coating reaction products from the coating chamber to the surrounding space.

Preferably, such aspiration induces an inward flow of ambient atmosphere surrounding substantially the entire periphery of the coating chamber. This creates a pneumatic seal between the oxidising conditions within the coating chamber and the ambient atmosphere.

In preferred embodiments of the invention, silane as coating precursor material is conveyed towards the coating chamber in vapour phase in a substantially inert carrier gas stream and oxygen is introduced into the silane-containing carrier gas stream before it enters the coating chamber. While it is essential when operating according to this invention, to have the oxygen and coating precursor silane intimately mixed before entry into the coating chamber, it is also an advantage to be able to control the length of time for which those reagents are mixed prior to supply to the coating chamber. Conveying the silane towards the coating chamber in a substantially inert carrier gas stream and then introducing oxygen to that carrier gas stream allows selection of the point where oxygen is to be introduced in order to achieve that control.

Advantageously, nitrogen is used as substantially inert carrier gas. Nitrogen is sufficiently inert for the purposes in view, and it is inexpensive when compared with the noble gases.

The oxygen required may be introduced as pure oxygen, but this adds unnecessarily to costs, and preferably, air is supplied to the carrier gas stream in order to introduce oxygen thereto.

The coating precursor and/or the oxygen may conveniently be introduced into the carrier gas stream by means of a venturi.

In preferred embodiments, turbulence is induced in the carrier gas stream to ensure intimate mixing of the substantially inert carrier gas and the silane. A certain amount of turbulence will be induced if a venturi is used as aforesaid, but this may be augmented for example by the use of a supply line which has a constriction downstream of the coating precursor introduction point. Such a constriction may be asymmetrical. Intimate mixing of the precursor into the carrier gas is ensured by inducing turbulence.

For similar reasons, it is advantageous that turbulence is induced in the carrier gas stream after the introduction of oxygen thereto to ensure intimate mixing of the silane-containing carrier gas and the oxygen.

The rate at which the coating reagents are to be supplied is to some extent dependent upon the desired thickness of the coating to be formed and upon the speed at which the substrate passes the coating chamber. Preferably, silane as coating precursor material is introduced into the coating chamber with a partial pressure of between 0.1% and 1.5%. A concentration within that range is suitable for forming coatings from about 30 nm to about 240 nm on a substrate travelling at up to 20 meters per minute.

Advantageously, for the production of coated glass which travels at a speed of less than about 10 meters per minute, silane as coating precursor material is introduced into the coating chamber with a partial pressure of between 0.1% and 0.4%.

Preferably, oxygen is introduced into the coating chamber with a partial pressure of between 0.6% and 20% A concentration within that range is again suitable for forming coatings from about 30 nm to about 240 nm on a substrate travelling at up to 20 meters per minute.

For the production of coated glass travelling at a speed of less than about 10 meters per minute, it is advantageous that oxygen is introduced into the coating chamber with a partial pressure of between 0.6% and 6.5%.

Preferably, steps are taken to limit the transfer of heat energy to the coating precursor material as it travels towards the glass. This maintains the temperature of the coating reagents at a lower level than environmental conditions would otherwise dictate, and further assists in reducing any tendency for premature reaction.

Advantageously, coating precursor material is supplied to contact the glass via at least one slot which extends, or which together extend, across at least the major part of the width of the coating which is to be formed on the glass. This facilitates the formation of a coating having a uniform thickness across the width of the glass substrate.

The invention extends to apparatus for pyrolytically forming an oxide coating on an upper face of a hot glass substrate, characterised in that such apparatus comprises support means for conveying the substrate along a path past a coating chamber defined by the substrate path and a downwardly opening hood, means for supplying to the coating chamber coating precursor material in the vapour phase which is premixed with oxygen, and means for aspirating atmosphere including coating reaction products and unused precursor material from the coating chamber.

Such apparatus can be constructed very simply in order to achieve early mixing of the gaseous oxygen and said coating precursor material before they reach said coating chamber. We have found that this early mixing of the coating reagents in vapour phase in turn affords great benefits in the achievement of a uniform coating across the width of the substrate. Surprisingly, the early mixing does not lead to such premature reaction of the coating precursor material as would be expected, and it is in fact favourable for the production of high quality coatings.

Such an apparatus may be used for coating individual reheated sheets of glass if desired. Alternatively, as in some preferred embodiments of the invention, said coating station is located within, or upstream of, a horizontal annealing lehr fed with glass by a glass ribbon forming machine. This has the advantage of avoiding the need for reheating apparatus.

It is generally preferred, however, that said support means is a bath of molten metal in a float chamber, and the coating chamber is located within the float chamber.

Such apparatus has the advantage of simplifying construction of an annealing lehr which is fed with glass from the float chamber. This is because during the time taken for the ribbon to pass from the coating station further along the float chamber and into the annealing lehr, the temperature profile of the coated ribbon can return to an equilibrium state which will have been disturbed by the heat extracted during the actual coating process. Accordingly, apparatus for regulating the temperature within the lehr does not need to take account of any differences between the production of glass when that coating station is switched into and out of operation so that temperature control within the lehr can be much simplified. The advantage of simplifying construction of an annealing lehr which is fed with the glass is even greater when it is desired to produce glass having a multi-layer coating, because in the case of pre-existing glass production plant, there may simply not be room outside the float chamber for the required number of coating stations without major reconstruction of that plant.

Advantageously, said coating chamber is defined by the substrate path and a downwardly opening hood, and aspirating means is provided around substantially the whole of the periphery of the coating chamber. This helps to avoid the escape of unused coating reagents and coating reaction products which might have a deleterious effect on apparatus within the vicinity of the coating station.

Preferably, said aspirating means is adapted to maintain an inward flow of ambient atmospheric material surrounding substantially the entire periphery of the coating chamber. This facilitates the prevention of escape of material from beneath the hood, and creates a pneumatic seal around the coating chamber.

Advantageously, means is provided for introducing coating precursor material into a carrier gas stream and for subsequently introducing oxygen into the precursor-containing carrier gas stream before it enters the coating chamber. While it is desirable when operating according to the first aspect of this invention, and indeed essential when operating according to the second aspect of this invention, to provide means for admixing the oxygen and coating precursor silane before entry into the coating chamber, it is also an advantage to be able to control the length of time for which those reagents are mixed prior to supply to the coating chamber. Conveying the silane towards the coating chamber in a substantially inert carrier gas stream and then subsequently introducing oxygen to that carrier gas stream allows selection of the point where oxygen is to be introduced in order to achieve that control.

Preferably, at least one venturi is provided for introducing at least one of said coating precursor material and gaseous oxygen into said carrier gas stream. This is a very simple way of introducing the respective material into the carrier gas stream in such a way that the introduced material becomes mixed with that gas stream.

In preferred embodiments, means is provided for inducing turbulence in the carrier gas stream to ensure intimate mixing of the carrier gas and the coating precursor material. Turbulence may be induced for example by the use of a supply line which has a constriction downstream of the coating precursor introduction point. Such a constriction may be asymmetrical. Intimate mixing of the precursor into the carrier gas is ensured by inducing turbulence.

For similar reasons, it is advantageous that means is provided for inducing turbulence in the carrier gas stream after the introduction of oxygen thereto to ensure intimate mixing of the precursor-containing carrier gas and the oxygen.

Advantageously, for the introduction of coating precursor material into the coating chamber, there is provided at least one slot which extends, or which together extend, across at least the major part of the width of the coating chamber. This facilitates the formation of a coating having a uniform thickness across the width of the substrate. For example a single slot may be provided at the centre of the hood, at right angles to the path of the substrate.

Preferably, means is provided for limiting the transfer of heat energy to the coating precursor material as it travels towards the coating chamber. This maintains the temperature of the coating reagents at a lower level than environmental conditions would otherwise dictate, and further assists in reducing any tendency for premature reaction.

BRIEF DESCRIPTION OF THE DRAWINGS

A preferred embodiment of the invention will now be described in greater detail by way of example only and with reference to the accompanying diagrammatic drawings in which.

DESCRIPTION OF THE PREFERRED EMBODIMENTS

Figure 1:
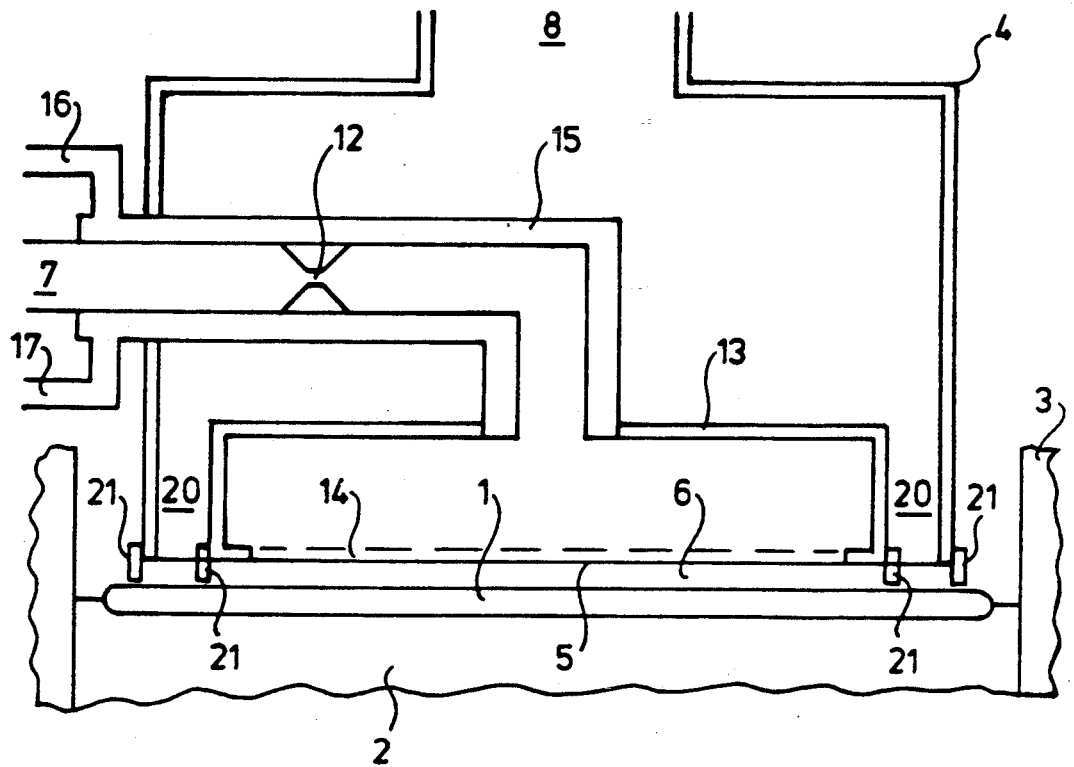
FIG. 1 is a transverse cross sectional view of a coating apparatus according to the invention located in a float chamber.

In the drawings, a ribbon 1 of glass is advanced along a path also indicated at 1 while it is supported by a bath of molten metal 2 contained within a float chamber 3. A coating station is surrounded by a wall and roof structure generally indicated at 4.

The coating station 4 comprises a hood 5 which defines a coating chamber 6 opening downwardly onto the ribbon path 1, a supply line 7 for feeding coating reagents to the coating chamber 6, and a chimney 8 for aspirating peripherally around the coating chamber.

The supply line 7 is fed with a substantially inert carrier gas such as nitrogen from a source which is not shown, and the coating precursor material such as silane is introduced into the carrier gas stream at a first venturi 9. The carrier gas stream with dispersed coating precursor flows along the supply line 7 to a first constriction 10 which is arranged to impart turbulence to the carrier gas stream to ensure intimate mixing of the carrier gas and the entrained coating precursor material. Further downstream, a second venturi 11 is provided for the introduction of oxygen, for example as a constituent of air. A further turbulence-inducing constriction 12 ensures intimate mixing of the oxygen and the entrained coating precursor material in the carrier gas stream. The coating reagents are fed by supply line 7 to a flow control block 13 having an exit slot 14 which extends across the major part of the width of the hood 5.

Figure 4:
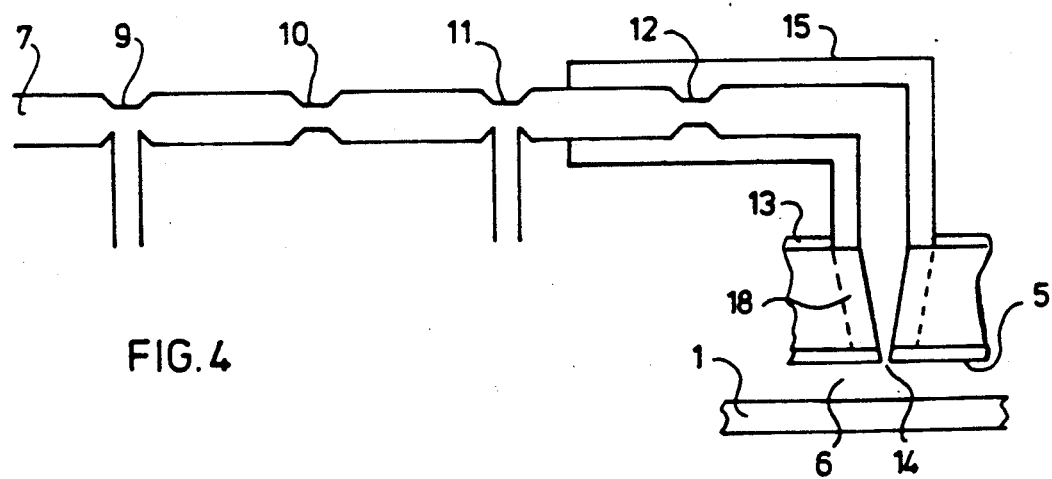
FIG. 4 illustrates the supply of coating reagents to a supply line feeding the coating station.

It is convenient to feed coating precursor material and oxygen to the supply line 7 outside the float chamber 3. At all parts within the float chamber 3, the supply line is surrounded with a cooling jacket 15 which is equipped with cooling water inlet 16 and outlet 17 as shown in FIG. 1. If desired, the cooling jacket may be extended within the flow control block 13 as shown at 18 in dotted lines in FIGS. 2 and 4 so that the coating reagents are protected against overheating until they exit from the slot 14 for contact with the ribbon 1 in the coating chamber 6.

Figure 2:
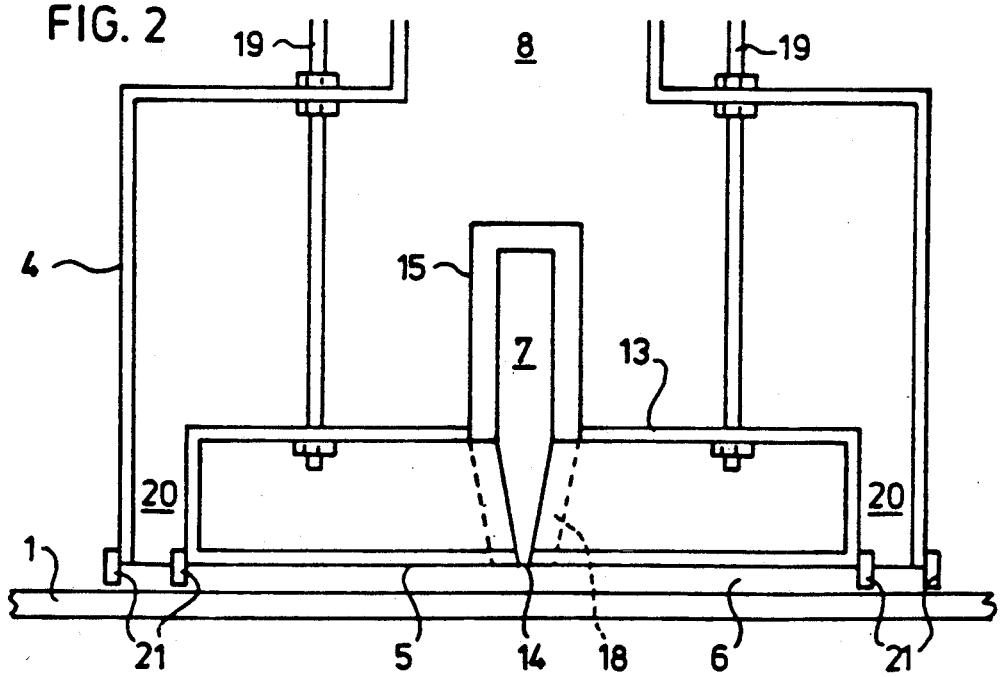
FIG. 2 is a longitudinal cross sectional view of the coating apparatus of FIG. 1.
Figure 3:
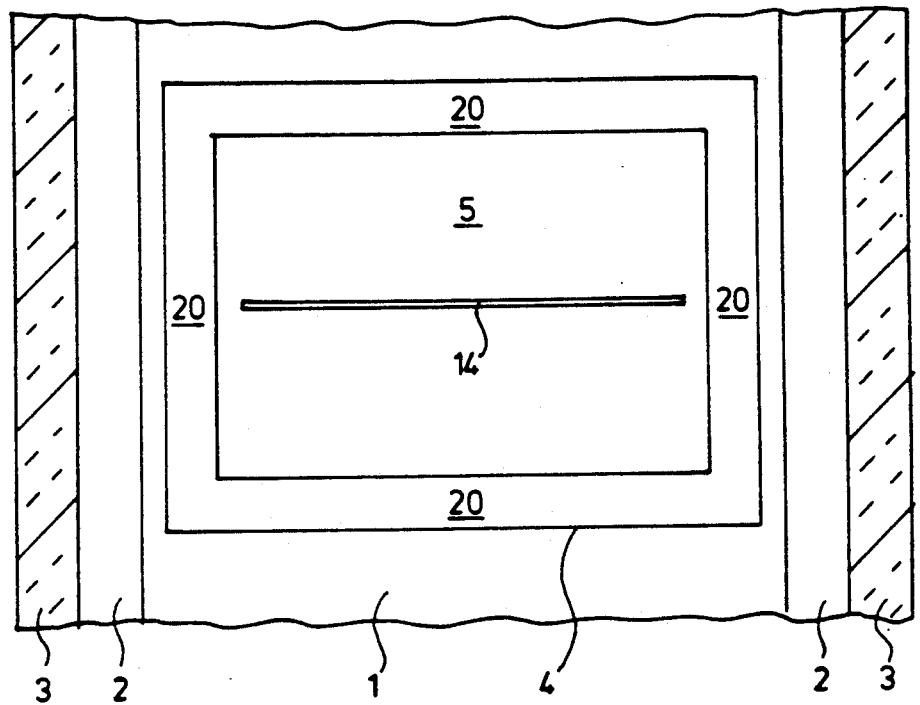
FIG. 3 is a diagrammatic plan view of the coating apparatus.

As shown in FIG. 2, the hood 5 and flow control block 13 are suitably suspended from the roof of the float chamber 3 by means of struts 19. It is desirable to use threaded struts 19 so that the height of the base of the hood 5 can be adjusted for small clearance, for example 2 cm or less, from the ribbon path 1.

The hood 5, the coating chamber 6, and the flow control block 13 are surrounded by a peripheral passage 20 via which coating reaction products and unused coating precursor material together with, if desired, inwardly aspirated ambient atmospheric material from the float chamber can be upwardly aspirated through chimney 8. The hood 5 and coating station wall structure 4 are shown provided with optional peripherally extending skirts 21 at the base of the peripheral passage 20. Those skirts are suitably constituted by flexible refractory curtains for example made of Refrasil (Trade Mark).

EXAMPLE 1

In a specific practical embodiment, for coating float glass advancing at a speed of 7 meters per minute along a float chamber, the coating station is located at a position along the float chamber where the glass is at a temperature of about 700° C. The supply line is fed with nitrogen, and silane is introduced thereto with a partial pressure of 0.25%, and oxygen is introduced with a partial pressure of 0.5% (ratio 0.5). The coating precursor material in its carrier gas is fed along the supply line 7 to exit a slot about 4 mm wide at such a rate that the supplied material flows along between the glass and the hood 5, which is 15 mm above the path 1 of the glass, at a speed of about 2 to 3 meters per second in both directions parallel to the direction of ribbon advance. The hood 5 has a length in that direction of about 40 cm. Atmospheric material is aspirated through the chimney 8 at such a rate as to generate an upward flow of gases in the peripheral passage 20 with a velocity of about 7 to 8 meters per second, and this causes a continuous inward flow of gas from the float chamber into the base of the passage 20 around the entire periphery of the coating chamber 6, so preventing escape into the float chamber of the coating reagents or their reaction products. Of course, such aspiration also draws off coating reaction products and unused coating reagents.

The coating formed is of silicon dioxide about 90 nm in thickness. In a subsequent coating step, performed in a manner known per se in a coating station located close to the upstream end of a horizontal annealing lehr, an upper coating layer of doped $SnO_2$ is formed to a thickness of about 500 nm. The combined coating is substantially free from unwanted colour variations due to interference effects.

In variant embodiments according to the second aspect only of this invention, the coating station shown in the drawings is located in an annealing lehr. In the description of the drawings, therefore, references to the float chamber may be replaced by references to an annealing lehr, and references to the bath of molten metal may be replaced by references to conveyor rolls.

EXAMPLE 2

In a specific practical embodiment, for coating float glass after it has been withdrawn from the float chamber, the coating station is located in an annealing lehr where the temperature of the glass is about 500° C., downstream of another coating station for forming a coating layer of doped $SnO_2$ about 350 nm in thickness.

The hood has a length of about 1 meter. Coating precursor reagents are introduced in the same proportions as in Example 1 in order to form a silicon dioxide overcoating about 100 nm in thickness. Again, the combined coating is substantially free from unwanted colour variations due to interference effects.

What is claimed is:

1. A method of pyrolytically forming a silicon oxide coating on a hot glass substrate as it travels through a coating chamber along a substrate path, the method comprising:
   a. intimately mixing a coating precursor material which contains silane and which is in vapor phase, and gaseous oxygen to form a gaseous mixture before introduction thereof into the coating chamber;
   b. introducing the gaseous mixture into the coating chamber; and
   c. contacting the hot glass substrate as it travels through the coating chamber with the gaseous mixture to pyrolytically form the silicon oxide coating thereon.

2. The method according to claim 1, wherein the hot glass substrate reaches the coating chamber with a temperature of at least 400° C.

3. The method according to claim 2, wherein the coating precursor material first contacts the hot glass substrate when the hot glass substrate has a temperature of at least 650° C.

4. The method according to claim 1, wherein the hot glass substrate is freshly-formed flat glass and wherein the gaseous mixture is brought into contact with an upper face thereof.

5. The method according to claim 4, wherein the coating chamber is positioned within a float chamber, wherein the hot glass substrate is a hot float glass substrate, and wherein the gaseous mixture is brought into contact with an upper face of the hot float glass substrate while the hot float glass substrate is within the float chamber in which it was manufactured.

6. The method according to claim 5, wherein the hot float glass substrate has an exit temperature characteristic thereof as it exits the float chamber if no coating is formed thereon, and wherein the gaseous mixture contacts the hot float glass substrate at a position along its travel through the float chamber at which the hot float glass substrate has a temperature which is one of at least 50° C. and at least 100° C. higher than the exit temperature.

7. The method according to claim 1, wherein the coating chamber is defined by the substrate path and a downwardly opening hood, and wherein the coating chamber is provided with aspiration means for aspirating substantially the entire periphery of the coating chamber.

8. The method according to claim 7, wherein aspiration induces an inward flow of ambient atmosphere thereby substantially surrounding the entire periphery of the coating chamber.

9. The method according to claim 1, wherein the coating precursor material is silane and is conveyed for mixing in step a in a stream of substantially inert carrier gas.

10. The method according to claim 9, wherein nitrogen is used as the substantially inert carrier gas.

11. The method according to claim 9, wherein the oxygen conveyed for mixing in step a is supplied as air.

12. The method according to claim 9, wherein turbulence is induced in the stream containing the coating precursor material to ensure intimate mixing of the substantially inert carrier gas and the coating precursor material.

13. The method according to claim 9, wherein turbulence is induced in the gaseous mixture of step (a) to ensure intimate mixing.

14. The method according to claim 1, wherein the coating precursor material is silane and the silane introduced into the coating chamber has a partial pressure ranging between 0.1% and 1.5%.

15. The method according to claim 14, wherein the silane introduced into the coating chamber has a partial pressure ranging between 0.1% and 0.4%.

16. The method according to claim 14, wherein the oxygen introduced into the coating chamber has a partial pressure ranging between 0.6% and 20%.

17. The method according to claim 16, wherein the oxygen introduced into the coating chamber has a partial pressure ranging between 0.6% and 6.5%.

18. The method according to claim 1, wherein cooling means are provided in step (c) to limit the transfer of heat energy to the coating precursor material in the gaseous mixture as it travels via a supply line towards the hot glass substrate.

19. The method according to claim 1, wherein the silicon oxide coating has a width, and wherein introduction of the gaseous mixture into the coating chamber in step b is via at least one slot which extends, or which together extend, substantially across the width of the silicon oxide coating which is to be formed on the hot glass substrate.

* * * * *

UNITED STATES PATENT AND TRADEMARK OFFICE
CERTIFICATE OF CORRECTION

PATENT NO. : 5,089,039

DATED : February 18, 1992

INVENTOR(S) : Robert Terneu & Jean-François Thomas

It is certified that error appears in the above-identified patent and that said Letters Patent is hereby corrected as shown below:

Title page, item [54] and col. 1, line 1, change

"PYROLXTICALLY" to --PYROLYTICALLY--.

Signed and Sealed this

Twenty-second Day of June, 1993

Attest:

MICHAEL K. KIRK

*Attesting Officer*     Acting Commissioner of Patents and Trademarks